United States Patent [19]
Holley

[11] Patent Number: 5,129,635
[45] Date of Patent: Jul. 14, 1992

[54] GAS SPRING WITH C-SHAPED SEAL

[75] Inventor: David M. Holley, Whitmore Lake, Mich.

[73] Assignee: Power Components, Inc., Redford, Mich.

[21] Appl. No.: 542,156

[22] Filed: Jun. 21, 1990

[51] Int. Cl.5 .......................... F16F 9/36; F16F 9/02
[52] U.S. Cl. ................... 267/129; 267/64.26; 188/322.17
[58] Field of Search ............ 267/64.26, 64.25, 64.28, 267/119, 129, 124, 11 B; 277/164, 205, 206 R; 188/284, 322.17, 322.19, 322.22

[56] References Cited

U.S. PATENT DOCUMENTS

| | | | |
|---|---|---|---|
| 1,288,937 | 12/1918 | Leinweber | 267/64.26 X |
| 3,797,366 | 3/1974 | Hanes et al. | 188/322.22 X |
| 4,508,356 | 4/1985 | Janian | 267/1.5 X |
| 4,792,128 | 12/1988 | Holley | 267/64.28 X |
| 4,896,866 | 1/1990 | Legrand et al. | 267/64.26 |

FOREIGN PATENT DOCUMENTS

| | | | |
|---|---|---|---|
| 267543 | 5/1988 | European Pat. Off. | 267/113 |
| 1435 | 1/1985 | Japan | 267/136 |
| 683966 | 8/1979 | U.S.S.R. | 188/322.19 |
| 906848 | 9/1962 | United Kingdom | 267/64.26 |

Primary Examiner—Robert J. Oberleitner
Assistant Examiner—Alfred Muratori
Attorney, Agent, or Firm—Barnes, Kisselle, Raisch, Choate, Whittemore & Hulbert

[57] ABSTRACT

A gas spring which provides two stages of resistance to axial movement, by a first head and rod slidably disposed within a second rod with a head, with both of the heads subjected to pressurized gas in a common chamber within the cylinder. Preferably, a seal for each provides sealing engagement when the force of pressurized gas acts upon the seal. Hence, the seal provides sealing engagement without being axially compressed and radially expanded. The seal may be used in single stage and two stage gas springs. Desirably, a positive stop for each rod is provided, preferably as a part of the housing for its bearings and seal. Preferably, the seal is a flexible annular sealing element which when viewed in cross section is generally a C-shape, with arms constructed and arranged so that the free edges of the seal are biased into sealing engagement by pressurized gas acting on the arms.

18 Claims, 2 Drawing Sheets

GAS SPRING WITH C-SHAPED SEAL

FIELD OF THE INVENTION

This invention relates to pneumatic devices, and more particularly to gas springs.

BACKGROUND OF THE INVENTION

Gas springs are utilized typically to yieldingly resist movement of a body such as a clamping ring for a metal blank in a die in a press for forming sheet metal parts.

Gas springs are generally constructed with an actuating rod connected to a piston or head slidably received in a cylinder having a chamber which is charged at a predetermined pressure, such as 2000 PSI, with an inert gas, such as nitrogen. This provides a gas spring or cushion permitting the rod to yieldably move toward its retracted position when a force applied externally to the rod exceeds the force produced thereon by the gas in the chamber. When the rod and head are forced into the chamber, the gas therein is compressed to a maximum operating pressure which is usually in the range of about 3,000 to 5,000 PSI, depending on the volume of the chamber and the effective area and stroke of the rod and piston. In normal use, the pressure to which a self-contained gas spring is initially charged is not varied or changed. The spring is initially charged, relieved and recharged through a high pressure valve of the type commonly used in aircraft struts and accumulators.

Previously, gas springs have been constructed with the rod being slidably received in a bearing and seal housing assembly received in the cylinder. This housing assembly has a rear housing slidably received on a front housing with a rod gasket or seal therebetween. In use, the seal is compressed axially so that it expands radially inward into firm sealing engagement with the rod by the force produced by pressurized gas in the chamber acting on the rear housing. The movement of the housing causes wear on adjacent parts and wear of the housing itself. Such a gas spring is shown in U.S. Pat. No. 4,792,128, which has a positive stop preventing the head from striking the housing assembly and damaging the bearings and seals.

U.S. Pat. No. 4,838,527 shows a gas spring which can be operated with either an external source of gas or as a precharged and self-contained unit by changing first and second valves assemblies either of which can be installed in the same cavity in the cylinder.

These gas springs require a substantial force to begin moving their rods toward their retracted positions. This force increases rapidly as their rods are retracted. The force required to begin this retraction stroke is often so substantial that a mechanical crankshaft type press may have difficulty producing sufficient force to retract the rod. This lengthens the press cycle time or even stalls the press. This may occur because the press produces relatively little force at the beginning of its stroke and most of its force near the very end of its stroke. With conventional presses and dies relatively little force need be applied to the clamping ring during the initial portion of the press stroke and a much greater force is required near the end of the press stroke. Excessive forces cause excessive wear on the crank, crank bearings and die parts. Thus, the desired force curve for press operations is opposite to that produced by prior gas springs.

SUMMARY OF THE INVENTION

A gas spring which provides two stages of resistance to axial movement, by a first head and rod slidably disposed within a second rod with a head, with both of the head subjected to pressurized gas in a common chamber within the cylinder. Preferably, a seal for each rod provides sealing engagement when the force of pressurized gas acts upon the seal. Hence, the seal provides sealing engagement without being axially compressed and radially expanded. The seal may be used in single stage and two stage gas springs. Desirably, a positive stop for each rod is provided, preferably as a part of the housing for its bearings and seal.

Preferably, the seal is a flexible annular sealing element which when viewed in cross section is generally a C-shape, with arms constructed and arranged so that the free edges of the seal are biased into sealing engagement by pressurized gas acting on the arms. Preferably, each arm has a terminal portion with a lip, biased inward in a relaxed state. Pressurized gas acts on the lip to force it outward and extend it to provide additional sealing surface area and a relatively sharp edge in contact with an adjacent surface to provide improved sealing.

Objects features and advantages of this invention are to provide a gas spring device which will provide a substantially lesser force at the beginning of its stroke in relation to the force at the end of its stroke, significantly decreases the tendency to slow down or stall a press, improved rod sealing characteristics, improved in service useful life, and is rugged, durable, reliable, of relatively simple design and economical manufacture and assembly.

BRIEF DESCRIPTION OF THE DRAWINGS

These and other objects, features and advantages of this invention will be apparent from the following detailed description, appended claims and accompanying drawings in which:

DETAILED DESCRIPTION OF THE PREFERRED EMBODIMENT

Figure 1:
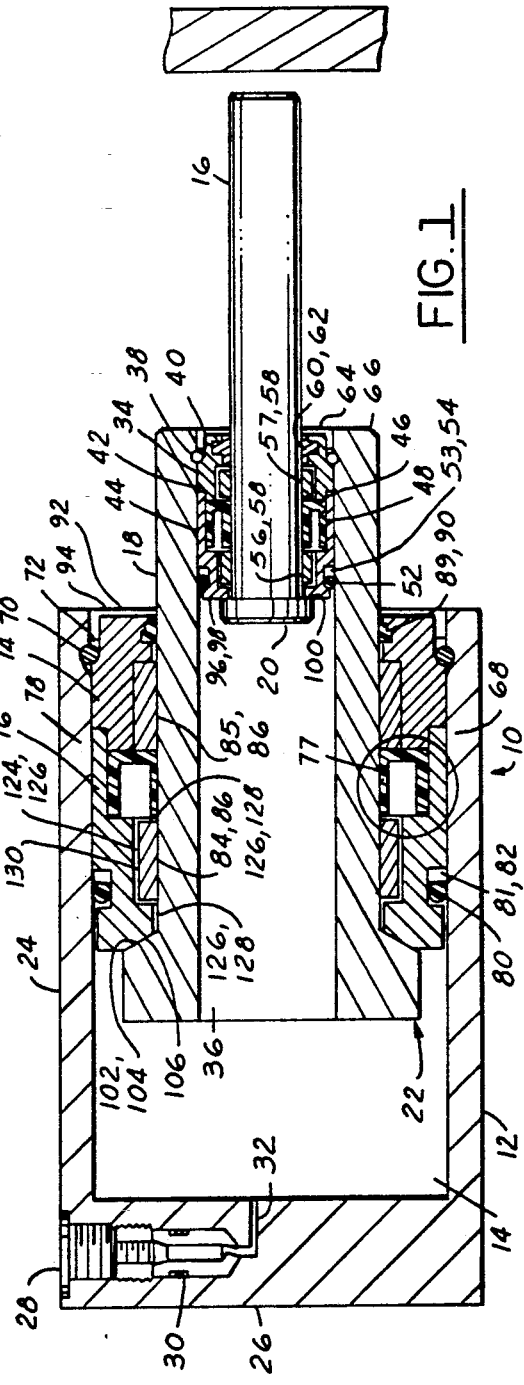
FIG. 1 is a sectional view of a two stage gas spring embodying this invention.

FIG. 1 illustrates a two-stage gas spring 10 embodying this invention. This gas spring 10 has a cylinder 12 defining at least in part a gas chamber 14 in which first and second rods 16 and 18 are telescopically received. To provide a spring or cushion, the rods 16, 18 are yieldably urged to their extended positions by pressurized gas in the chamber 14 which acts on the pistons or heads 20, 22 of the rods 16, 18. When a force is applied externally to the rods 16, 18, such as through a die plate, which force is greater than the force produced on the rod or rods by the gas in the chamber, initially the first rod 16 and then subsequently both rods 16, 18 in unison are yieldably moved toward their retracted positions.

Preferably, the cylinder 12 has a separate tube 24 and an end cap 26 permanently fixed to the tube by a circumferentially continuous seam weld. A filler and bleed poppet valve assembly 28 is preferably removably received in a valve cavity 30 in the cap 26 and communicates with the chamber 14 through a passage 32.

The first rod 16 is slidably received in a bearing and seal assembly 34 disposed in a bore 36 through the second rod 18 and releasably retained therein by ring segments 38 received in a groove 40 in the bore 36. This assembly has a front housing 42 slidably received preferably with an interference fit in a rear housing 44 with a rod seal 46 received between the in a counterbore 48 in the rear housing 44. A seal is provided between the second rod 18 and the rear housing 44 by an 0-ring 52 and back-up ring 53 received in a groove 54 therein. The rod 16 is slidably received in bearings 56, 57 received in counterbores 58 in the front and rear housings 42, 44. To prevent contaminants entering the assembly 34, preferably a rod scraper 60 encircles the rod 16 and is received in a recess 62 in the front housing 42, and a dust cap 64 overlies the assembly 34 and is received and frictionally retained in the end 66 of the second rod 18.

Similarly, the second rod 18 is slidably received in a bearing and seal assembly 68 disposed in the tube 24 of the cylinder 12 and releasably retained therein by ring segments 70 received in a groove 72 in the tube 24. This assembly has a front housing 74 slidably received preferably with an interference fit in a rear housing 76 with a rod seal 77 received between them in a counterbore 78 in the rear housing 76. A seal between the tube 24 and the rear housing 76 is provided by an 0-ring 80 and back-up ring 81 received in a groove 82 therein. The second rod 18 is slidably received in bearings 84, 85 which are received in counterbores 86 in the front and rear housings 74, 76. Preferably, to prevent contamination of the assembly 68, a rod scraper 89 is received in a recess 90 in the front housing 74 and a dust cap 92 overlies the bearing assembly 68 and is received and frictionally retained in the end 94 of the tube 24.

The bearings 58, 84 are of a suitable material such as sintered bronze. To insure adequate lubrication of the bearings 56, 57, 84, 85, and particularly the rear bearings, they are impregnated with lubricant and a small quantity of a synthetic high temperature lubricating oil is also disposed in the chamber 14.

To provide a longer life in service, relatively little clearance is provided between each rod 16, 18 and its bearings 58, 84. This clearance is usually about 0.002 to 0.004 of an inch per side or a total clearance of 0.004 to 0.008 of an inch between the diameters of each rod and its associated bearings. To achieve these close tolerances, preferably the bearings are sized after being pressed into their housings.

Movement of the first rod 16 to its extended position is limited by a positive stop 96 provided by cooperation of an end face 98 of the rear housing 44 with a complementary shoulder 100 on the head 20 of the first rod 16. Movement of the second rod 18 to its extended position is limited by a positive stop 102 provided by engagement of a conical surface 104 on the back face 106 of the rear housing 76 with a complementary surface on the head 22 of the second rod 18.

Figure 2:
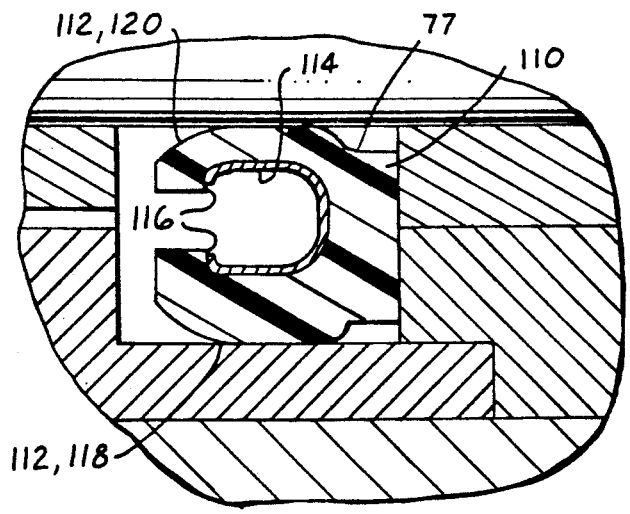
FIG. 2 is an enlarged view of the encircled portion of FIG. 1 showing a seal in its relaxed state.

While the rod seals 46, 77 differ in diameter, preferably they have essentially the same construction and arrangement. In accordance with another feature of this invention, these seals have a circumferentially continuous sealing ring 110 which, as shown in FIG. 2, in a relaxed or unflexed state, has in cross section a generally C-shape with side walls or arms 112, the central portions of which are urged into contact with their adjacent rod and housing surfaces by a circumferentially continuous metal spring element 114 received in the ring 110. Preferably, the ring 110 is made of a low friction and highly wear resistant elastomeric material such as an ultra high molecular weight polyethylene.

Figure 3:
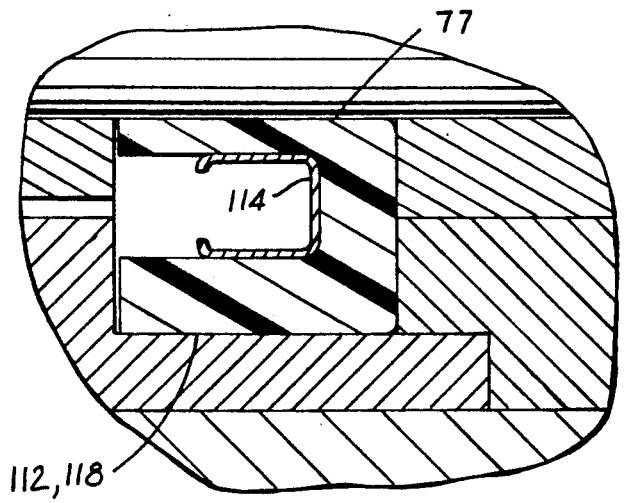
FIG. 3 is an enlarged view of the encircled portion of FIG. 1 showing a seal in its extended state.

Preferably, the free edges of the arms 12 have generally right angular surfaces defining a sharp peripheral edge or lip 116. In assembly, when pressurized gas is admitted to the chamber 14, as shown in FIG. 3, the arms 112 are extended and forced along with the lips 116 into firm sealing engagement with the adjacent surfaces of the rods 16, 18 and housings 44, 76. The pressurized gas forces the ring 110 to engage with and conform to the peripheral surfaces of the cavity in which it is received. Appropriate seals as thus far described are disclosed in U.S. Pat. No. 4,508,356 and commercially available from Tetraflour, Inc., 2051 E. Maple Avenue, El Segundo, California 90245, under the tradename "TETRALENE MULTI-FLEX SEALS".

It has been found that further improved sealing performance and a significantly decreased tendency for the seal to cock or turn in the groove and thereby leak can be achieved if the outer wall or arm 118 of the ring 110 is substantially thicker than its inner wall or arm 120. Preferably, as illustrated in the drawings, the radial thickness of the outer wall 118 is about 110% to 250% times the radial thickness of the inner wall 120.

The interior of each seal continuously communicates with the chamber 14 through one or more passages 124, which are preferably formed by interconnected grooves 126 in the rear bearings 56, 84. Preferably, grooves 126 extend radially across the opposed end faces 128 of each rear bearing 56, 84 and are interconnected by a groove 126 extending axially across the outer peripheral surface 130 of each bearing 56, 84. Preferably, there are two or three sets of these grooves 126 circumferentially spaced about each bearing 56, 84. To prevent each rear bearing 56, 84 from being moved axially in its rear housing 44, 76 into the seal 46, 77 which might well damage it, these passages 124 also substantially equalize the pressure of gas acting on the opposed end faces 128 of each bearing 56, 84. During charging and use of the gas cylinder 12, there are substantial gas pressure spikes or variations which without these passages 124 would produce a substantial difference in the pressure of the gas acting on opposed end faces 128 of the bearings 56, 84 which would move or shift the bearings 56, 84 axially in their housings 44, 76.

This bearing, seal and housing construction permits and facilitates the use of close tolerances and even interference fits between the bearings and housing members. The housing member is not required to move axially to compress and radially expand the seal. Elimination of this movement and use of close tolerances substantially reduces wear on the component parts and greatly extends the useful service life of the gas spring. Moreover, these close tolerances in conjunction with lubrication of the parts further enhances sealing and minimizes leakage of pressurized gas from the chamber.

Figure 4:
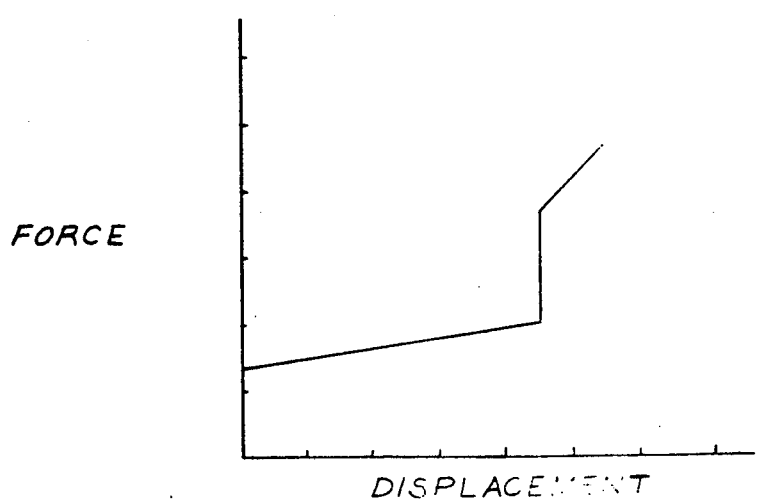
FIG. 4 is a force vs. displacement curve of the two stage gas spring.

In use, the chamber is precharged with a compressed gas, such as nitrogen, to a relatively high internal pressure such as 2000 psi. As shown in the force versus displacement curve of FIG. 4, a relatively small force is required to initially retract the first rod 16 and this force increases only modestly as the first rod 16 is retracted, such as by advancement of the die plate, until the plate also bears on the second rod 18. This relatively low force for displacement of the first rod 16 is due to the relatively small area of its head 20 and the fact that the movement of the first rod 16 and head 20 only moderately compresses the gas in the chamber 14 and thereby only moderately increases the force required to continue to move the rod 16 toward its retracted position. However, as indicated in FIG. 4, when the plate bears on the second rod 18 the total force required to simultaneously displace both rods 16, 18 increases substantially and the total force required to continue to move both rods toward their fully retracted positions increases rapidly. The increase in force required to initiate retraction of the second rod 18 is due to the gas in the chamber 14 acting on the area of the second head 22 and the rapid increase of the force required to continue moving both rods 16, 18 toward their fully retracted positions is due to compression of the gas in the cylinder 12 by both heads 20, 22 and rods 16, 18 which rapidly increases its pressure and thus the force it exerts on both rods.

Figure 5:
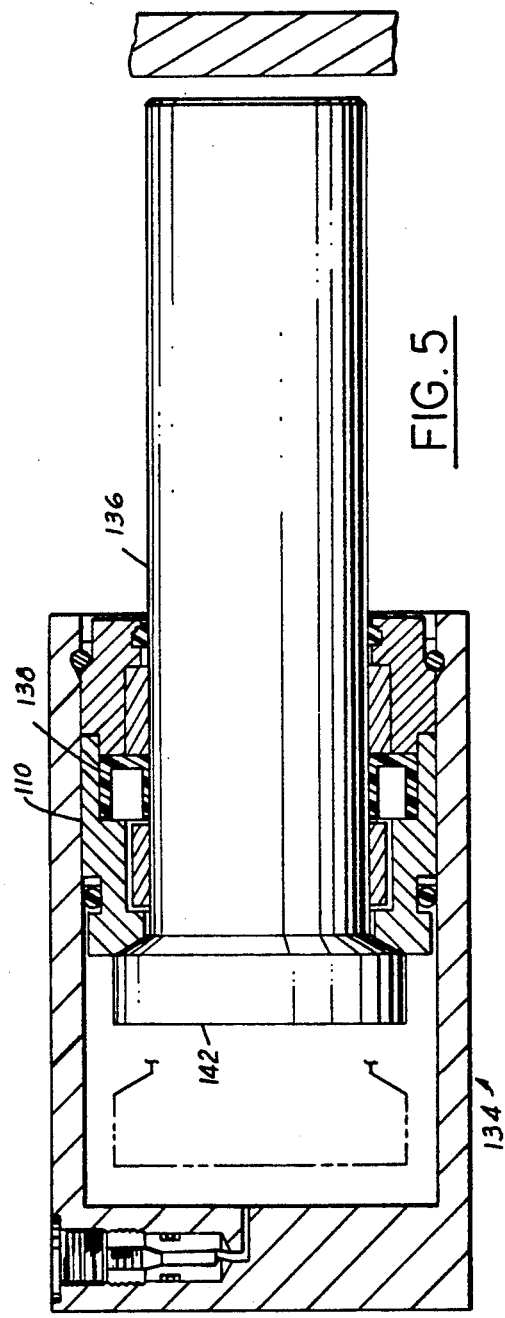
FIG. 5 is a sectional view of a single stage gas spring embodying this invention.

FIG. 5 illustrates a modified gas spring 134 which is the same as the two-stage gas spring 10 except that is has a single rod 136 with a seal 138. This spring 134 illustrates application of the seal, bearing housing assembly 140 to gas springs having a single rod 136 and head 142.

In testing gas springs embodying this invention, and particularly two-rod springs, they have been found to operate at a substantially lower temperature and with substantially less wear on the rod. Indeed, two-rod gas springs embodying this invention have been tested for more than 1,000,000 substantially continuous cycles without any detected wear. In contrast, prior gas springs have failed after as few as 5,000 continuous cycles. In these two-rod gas springs, the first rod was moved toward its retracted position from 0 to 3" by application of a force to its free end which increased generally linearly from about 617 lbs. to 691 lbs. and then both rods were moved simultaneously and additional 1" by application of a force to their free ends which increased linearly from about 6108 lbs. to 9816 lbs. In contrast, in comparably sized springs with a cylinder of the same diameter and length and a single rod and head like that of FIG. 5, the rod moved towards its retracted position from 0 to 4" by application of a force to its free end which increased generally linearly from 6108 lbs. to 9719 lbs.

I claim:

1. A gas spring device comprising a cylinder defining at least in part a gas chamber, a first rod with a first head and a free end, a second rod with a second head and a free end, a bore through said second rod, said first rod telescopically received in said second rod, said second rod telescopically received in said cylinder, both of said first and second heads communicating with and movable into said gas chamber, a first housing received in said second rod, at least one bearing carried by said first housing and journaling said first rod for reciprocal movement relative to said second rod, a first seal carried by said first housing and providing a seal between said first rod and said first housing, a second housing received in said cylinder, at least one second bearing carried by said second housing and journaling said second rod for reciprocal movement relative to said cylinder, a second seal carried by said second housing and providing a seal between said second housing and said second rod, both said first and second heads are constructed and arranged so that they are both acted on by the same compressed gas in said chamber to each urge its associated rod to its extended position relative to said cylinder and thereby yieldably dispose both of said rods in extended positions relative to said cylinder with said free ends in axially spaced apart relation and when actuated initially only said first rod is retracted and telescoped into said second rod and thereafter both said first and second rods are retracted in unison and telescoped into said cylinder thereby providing a gas spring with two stages of resistance to axial movement.

2. The gas spring device of claim 1 which also comprises said first seal having a flexible annular sealing element having in cross section a generally C-shape with arms constructed and arranged so that the free edges are biased into sealing engagement with the first rod and the first housing when compressed gas in the chamber acts on said arms, and said second seal having a flexible annular sealing element having in cross section a generally C-shape with arms constructed and arranged so that the free edges are biased into sealing engagement with the second rod and the second housing when compressed gas in the chamber acts on said arms.

3. The gas spring device of claim 2 wherein the arm of said first seal engagable with said first housing has a radial thickness at least about 110% of the radial thickness of the arm of said first seal engagable with said first rod.

4. The gas spring device of claim 2 wherein the arm of said second seal engagable with said second housing has a radial thickness at least about 110% of the radial thickness of the arm of said second seal engagable with said second rod.

5. The gas spring device of claim 1 wherein said bearing in said first housing is disposed in a first recess in said first housing between said first seal and the head end of said first rod, and said first seal is constructed and arranged to sealingly engage said first rod and first housing.

6. The gas spring device of claim 1 wherein said first head has a surface engagable with a surface on said first housing to provide a positive stop limiting the extent to which said first rod can be axially extended relative to said second rod, 7. The gas spring device of claim 1 wherein said second head has a surface engagable with a surface on said second housing to provide a positive stop limiting the extent to which said second rod can be axially extended relative to said cylinder.

8. A gas spring device comprising a cylinder defining at least in part a gas chamber, a first rod with a first head, a second rod with a second head, a bore through said second rod, said first rod telescopically received in said second rod, said second rod telescopically received in said cylinder, both of said first and second heads communicating with said gas chamber, a first housing received in said second rod, at least one bearing carried by said first hosing and journaling said first rod for reciprocal movement relative to said second rod, a first seal carried by said first housing and providing a seal between said first rod and said first housing, a second housing received in said cylinder, at least one second bearing carried by said second housing and journaling said second rod for reciprocal movement relative to said cylinder, a second seal carried by said second housing and providing a seal between said second housing and said second rod, both said first and second heads being constructed and arranged so that they are both acted on by a compressed gas in said chamber to each urge its associated rod to its extended position relative to said cylinder, said first seal having a flexible annular sealing element having in cross section a generally C-shape with arms constructed and arranged so that the free edges are biased into sealing engagement with the first rod and the first housing when compressed gas in the chamber acts on said arms, and said second seal having a flexible annular sealing element having in cross section a generally C-shape with arms constructed and arranged so that the free edges are biased into sealing engagement with the second rod and the second housing when compressed gas in the chamber acts on said arms.

9. A gas spring device comprising a cylinder defining at least in part a gas chamber, a first rod with a first head, a second rod with a second head, a bore through said second rod, said first rod telescopically received in said second rod, said second rod telescopically received in said cylinder, both of said first and second heads communicating with said gas chamber, a first housing received in said second rod, at least one bearing carried by said first housing and journaling said first rod for reciprocal movement relative to said second rod, a first seal carried by said first hosing and providing a seal between said first rod and said first housing, a second housing received in said cylinder, at least one second bearing carried by said second housing and journaling said second rod for reciprocal movement relative to said cylinder, a second seal carried by said second housing and providing a seal between said second housing and said second rod, both said first and second heads being constructed and arranged so that they are both acted on by a compressed gas in said chamber to each urge its associated rod to its extended position relative to said cylinder, said bearing in said first housing is disposed in a first recess in said first housing between said first seal and the head end of said first rod, said first seal is constructed and arranged to sealingly engage said first rod and said first housing, and said bearing in said first hosing has inner and outer surfaces and first and second end faces and at least one passage, said passage having an axial groove which extends axially along said outer surface from the first end face to the second end face and a radial groove which extends radially along said first end face from said inner surface to said axial groove of said outer surface and a radial groove which extends radially along said second end face from said inner surface to said axial groove of said outer surface thereby forming said at least one passage which continuously communicates with said gas chamber and said first seal to minimize the difference in gas pressure at said first and second end faces of aid bearing in said first housing.

10. The gas spring device of claim 9 wherein said bearing in said second housing is disposed in a recess in said second housing between said second seal and the head end of said second rod, and said second seal is constructed and arranged to sealingly engage said second rod and said second housing.

11. The gas spring device of claim 10 wherein said bearing in said second housing has inner and outer surfaces and first and second end faces and at least one passage, said passage having an axial groove which extends axially along said outer surface from the first end face to the second end face and a radial groove which extends radially along said first end face from said inner surface to said axial groove of said outer surface and a radial groove which extends radially along said second end face from said inner surface to said axial groove of said outer surface thereby forming said at least one passage which continuously communicates with said gas chamber and said second seal to minimize the difference in gas pressure at said first and second end faces of said bearing in said second housing.

12. A gas spring device comprising a cylinder defining at least in part a gas chamber, a rod slidably received in said cylinder and extending generally axially through one end of said cylinder with a head constructed and arranged to compress a gas within said gas chamber when moving from its extended position toward its retracted position, a housing in said cylinder encircling said rod, said housing being releasably retained in said cylinder, a recess in said housing, a seal in said recess, said seal having a flexible annular sealing element having in cross section a generally C-shape with arms constructed and arranged so that the free edges of said arms are biased into sealing engagement with the rod and the housing so as to prevent leakage of pressurized gas from the cylinder by pressurized gas within the chamber acting upon said arms.

13. The gas spring device of claim 12 wherein each one of said arms includes a terminal portion having a lip biased inward in a relaxed state and biased outward in an extended state by pressurized gas in the chamber acting upon said arms.

14. The gas spring device of claim 13 including a bearing disposed in a recess in said housing between said seal and the head end of said rod, and said seal is constructed and arranged to sealingly engage said rod and said housing when a pressurized gas acts upon said arms.

15. The gas spring device of claim 14 wherein said bearing has inner and outer surfaces and first and second end faces and at least one passage, said passage having an axial groove which extends generally axially along said outer surface from the first end face to the second end face and a radial groove which extends radially along said first end face from said inner surface to said axial groove of said outer surface and a radial groove which extends radially along said second end face from said inner surface to said axial groove of said outer surface thereby forming said at least one passage which continuously communicates with said gas chamber and said seal to minimize the difference in gas pressure at said first and second end faces of said bearing.

16. The gas spring device of claim 13 wherein the arm of said seal engagable with said first housing has a radial thickness at least about 110% to 250% of the radial thickness of the arm of said seal engagable with said rod.

17. The gas spring device of claim 12 wherein said head has a surface engagable with a surface on said housing to provide a positive stop limiting the extent to which said rod can be axially extended relative to said cylinder.

18. The gas spring device of claim 12 wherein the arm of said seal engagable with said housing has a radial thickness at least about 110% of the radial thickness of the arm of said seal engagable with said rod.

* * * * *